United States Patent Office 2,808,359
Patented Oct. 1, 1957

2,808,359

INSECT REPELLENT COMPOSITIONS OF HYDROXY-ALKYL ESTERS OF POLYBASIC ORGANIC ACIDS AND METHODS OF USING SAME

Alfred F. Schmutzler, Summit, N. J.

No Drawing. Application February 19, 1957,
Serial No. 641,016

25 Claims. (Cl. 167—22)

This invention relates to new and useful compositions of matter suitable as insect repellents, and in particular to insect repellents containing a hydroxyalkyl ester of a polybasic organic acid as one of the important ingredients.

This application is a continuation-in-part of my application Serial No. 223,443, filed April 27, 1951, now abandoned, which in turn is a continuation-in-part of my application Serial No. 729,671, filed February 19, 1947, now abandoned.

The usual insect repellents are fairly volatile. They have the disadvantage of giving protection for relatively short periods of time due to their disappearing caused by evaporation and absorption by the skin. Though most of them are nontoxic, they are not always harmless and sometimes cause skin irritations and rashes. For this reason, no absorption of the repellent is preferred for reasons of health as well as for reducing loss of repellent. Both absorption and evaporation necessitate frequent applications which are bothersome and time-consuming.

It has been found that absorption by the skin and evaporation can be greatly reduced by mixing the volatile insect repellent with a substantially nonvolatile hydroxyalkyl ester of a dicarboxylic acid. The resulting mixtures have the unexpected characteristic of much better repellency; they prevent insects from landing on men and animals protected with these novel repellent compositions for a much longer time than either alone.

It has furthermore been found that the absorption of a hydroxyalkyl dicarboxylate by the skin is negligible; and since these esters have very high boiling points, they have no tendency to disappear due to evaporation. In mixtures, they have the unexpected characteristic of fixing the volatile insect repellents by lowering their rate of evaporation and decreasing their absorption by the skin.

It has also been found that these substantially nonvolatile hydroxyalkyl esters of dicarboxylic acids form lasting protective layers over the skin and thus protect it from insects.

It has furthermore been found that the hydroxyalkyl esters of the tricarboxylic acids, tetracarboxylic acids and hexacarboxylic acids have insect repellent properties and that their fixative effects for volatile insect repellents is like that of the hydroxyalkyl esters of the dicarboxylic acids.

Thus, it is one of the objects of this invention to provide for more effective and longer lasting insect repellents.

It is a further object to provide for more effective and longer lasting insect repellents which are nontoxic to men and domesticated animals.

It is a further object of this invention to provide for more effective and longer lasting insect repellents for banishing insects from structures and buildings.

For these purposes, the most suitable hydroxylakyl esters of the polycarboxylic acids are most economically prepared with a moderate excess of glycol at temperatures where substantially no dehydration of the glycols and no decarboxylation of the polycarboxylic acids take place. These objects are accomplished in the presence of an inert solvent and a small amount of catalyst, as indicated in my application Serial No. 729,671, filed February 19, 1947.

The useful esters of the dicarboxylic acids are the bis-(glycol) mono(dicarboxylates), such as bis(2-ethyl-3-hydroxyhexyl) naphthalate or the like, monoalkyl monohydroxyalkyl dicarboxylates, such as methyl 2-ethyl-3-hydroxyhexyl naphthalate or the like, and hydroxyalkyl carbamylcarboxylates, such as 2-ethyl-3-hydroxyhexyl N,N-di-(cyclohexyl)carbamylbenzoate or the like. They can be represented by the following chemical formula:

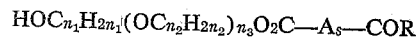

$$HOC_{n_1}H_{2n_1}(OC_{n_2}H_{2n_2})_{n_3}O_2C\text{---}A_s\text{---}COR$$

where $n_1$ and $n_2$ are integers larger than one, $n_3$ is a numeral selected from the group of numerals consisting of the numeral zero and the integers from one to four, A is a radical of a dibasic acid selected from the group of radicals consisting of $C_nH_n$, $C_nH_{2n}$, $C_6H_4$, $C_6H_{10}$, $C_7H_8$ and the like, s is a numeral selected from the group consisting of zero and one, and R is a radical selected from the group consisting of an alkoxy radical, a hydroxyalkoxy radical, and an amido radical with the general formula NR'R'', where R' and R'' are selected from the group of radicals consisting of hydrogen, alkyl, and hydroxyalkyl radicals.

These hydroxyalkyl esters are viscous liquids with very high boiling points and very low vapor pressures, and they possess insect repelling properties. Similarly, the hydroxyalkyl esters of the tricarboxylic acids, more viscous than the corresponding esters of the dicarboxylic acids and with almost imperctible vapor pressures, are also good in repelling insects; and other polycarboxylic acids, such as tetra-, penta- and hexacarboxylic acids, form similar esters of high viscosities, high boiling points and very low vapor pressures; and they have been found to possess insect repellent properties individually by themselves but better repellency in mixtures with a more volatile insect repellent, which in turn is made more effective and longer lasting by having been combined with the more stable, substantially nonvolatile hydroxyalkyl esters.

Though these hydroyalkyl esters of the polycarboxylic acids can be used as the pure esters for repelling insects from structures and dwellings or for preventing their landing on humans and animals, their application is facilitated and their effectiveness is increased as solutions in liquids, such as ethyl alcohol, toluol, xylol, kerosene and similar petroleum oils, ethers, ketones, aldehydes and the like. For purposes of rubbing applications to parts of the human body, impregnating garments and for spraying on animals, the preferred diluents are nontoxic and nonirritating liquids; but for spraying dwellings and other structures, any miscible liquid can be used, even those that are irritating and toxic.

For rubbing-on-applications, it might appear that without alcohol longer repellency is obtained, but this observation is only partly true, as without diluent, heavier films have to be rubbed on, whereas with the thinned ester, just a little of it will cover the same area. If one gram of hydroxyalkyl ester is used by itself in one test and if one gram of ester is used as a solution in another test, it will be noticed that the second application will give better protection for a longer time than the first. This result was unexpected, as ordinarily flies are attracted by alcohol-containing paint films, whereas with insect-repellent compositions, they were repelled or, at least, they were not attracted. The unexpected result might be explained on the basis of easier application of the diluted ester, but it is more plausible that besides this physical function, there is an additional biological function, which can be explained by the fact that the skin of warmblooded animals is teeming with bacteria. Since alcohol kills or makes bacteria impotent, the combination of alcohol and hydroxyalkyl ester prevents further decomposition by bacteria of skin exudations and by forming a protective, bacteria-excluding layer. Apparently sufficient alcohol is retained in the protective layer to keep the trapped bacteria on the skin impotent. Since ketones, aldehydes, phenols and terpenes possess these bactericidal properties like alcohols, the better repellency with solutions containing these liquids might be due to this biological function, though this explanation does not apply directly to esters, such as ethyl acetate, dimethyl phthalate, and the like, and the petroleum oils, whose mixtures with the hydroxyalkyl esters also show similar synergistic effects.

An application of a mixture of equal parts of oil of penny-royal and bis(hydroxyalkyl) naphthalate on one arm of a man working in mosquito-infested woodland prevented landings for six hours, whereas the hydroxyalkyl ester, applied to the other arm, prevented landings for but 2½ hours. Similarly, the mixture dissolved in 90% ethyl alcohol, and applied as a 10% solution (based on the mixture), of which 10 milliliters were applied to an arm, gave the following protection: 4¼ hours for the first landing and 7 hours for the first bite, whereas an equal volume of a 10% solution of oil of pennyroyal merely protected the other arm for 1¼ hour. The nonvolatile ester undoubtedly acted like a fixative for the volatile insect repellent. The same effect, which is similar to synergism, was also observed with the other volatile insect repellents, which give protection for short intervals. All of them extended the period between application and the first landing from 50 to 300%. They, in turn, showed the same effect with other hydroxyalkyl esters, such as bis(hydroxyethoxyethyl)phthalate, tris(hydroxybutyl) citrate, tetris(hydroxyethyl) mellophanate, 3-hydroxy-2-ethylhexyl N,N-di(cyclohexyl)carbamylbenzoate, 3-hydroxybutyl cyclohexyl glutarate, and ethyl 3-hydroxy-2-ethylhexyl naphthalate.

All of these hydroxyalkyl esters of the polybasic acids are not volatile but they have either a very mild odor or they are almost odorless. Though many of them have an almost imperceptible odor, they are nevertheless offensive and repel insects for long intervals of time at a distance so that there is no landing on the protected parts of the human body. After their repellency at a distance has been lost, they still prevent insects from biting for an unusually long time apparently not experienced heretofore. It has been noticed that this repellency thus consists of two periods; during the first the repellent odor of the hydroxyalkyl ester excels the attractile human odor, and during the second the agreeable and disagreeable odors are balanced at a distance so that the insect will actually land without biting because at close proximity the repellent characteristics are still prevalent. Further perspiration will contaminate the hydroxyalkyl ester so much as to supersede the repellent characteristics by attractile properties of the covered area when the insect will be tempted to bite. When these substantially nonvolatile esters are mixed with the more volatile and shortlived, yet effective, insect repellents, the combination of odors of the two types of insect repellents excells the attractile human odor for a longer time due to synergistic effects. The fixative characteristics of substantially nonvolatile hydroxyalkyl ester, though preventing the otherwise rapid evaporation of the volatile insect repellent, decreases the vapor pressure in the mixture of the volatile compound and thus retains it for a longer effective insect repellency at a distance.

It has been stated in the prior patent literature that substances that are not volatile are not insect repellents. Yet, these hydroxyalkyl esters are substantially nonvolatile and they have insect-repellent properties. They prove that other factors than volatility are required for their repellency; they must have a high degree of unpleasantness or offensiveness toward insects, such as mosquitoes and flies, with the indication that insect repellency of a compound is the product of its volatility and its degree of offensiveness toward insects.

In northern Maine and in Canada, the black flies, a species of Simulinum, molests men and other warmblooded animals alike when arriving in large swarms, especially during the hours of twilight. The usual insect repellents, such as oil of citronella, oil of peppermint, dimethyl phthalate, dibutyl maleate, Cellosolve acetate, Cellosolve lactate and diethyl adipate were found rather ineffective to discourage these insects from landing; however, the substantially nonvolatile esters of glycols and polybasic acids, such as bis(hydroxyethoxyethyl) phthalate, bis(hydroxyethyl) naphthalate, bis(3-hydroxy-2-ethylhexyl)maleate, bis(3-hydroxy-2-ethylhexyl) adipate, tetra(hydroxyethyl) mellophanate, tris-(3-hydroxybutyl citrate, 3-hydroxy-2-ethylhexyl N,N-di(cyclohexyl)carbamylbenzoate, and ethyl 3-hydroxy-2-ethylhexyl naphthalate were very effective in preventing their landings. These results were quite unexpected, as very few natives of these sections had any faith in the usual insect repellents for protecting them from the flies for any length of time. In the usual cases, the aforedescribed first group of relatively volatile compounds extended some protection as long as the solvent layer was clearly visible, but as soon as the shiny liquid surface disappeared, the insects started to land though the odor of the compound could easily be detected. Even with the extra heavy applications and accompanying ill comfort, the protection lasted less than an hour. Apparently these compounds are readily absorbed by the skin, whereas the novel insect repellents comprising hydroxyalkyl esters of polybasic acids show no tendency for being absorbed by the skin. This unexpected difference is most likely the cause for the longer repellency periods of from about three to seven hours and more for the very high molecular weight hydroxyalkyl esters of the tribasic, tetrabasic and hexabasic organic acids. With these hydroxyalkyl esters of the polybasic acids, no shiny liquid film need be visible for effective insect repellent properties.

The protective film of these novel insect repellents can be felt when rubbing over the thus-protected skin; otherwise, the wearers did not notice any other discomforts. The wet or sometimes sticky feeling can be eliminated by several means, such as the addition of stearic acid or bentonite or some other non-tacky powdery solid with these esters. Many procedures for accomplishing the object are known, and it is deemed unnecessary to describe them in detail. Stearic acid can be incorporated in a mixture of the ester and an alcohol or a mixture of the ester and a more volatile insect repellent, such as oil of citronella, oil of peppermint, dibutyl maleate, dimethyl phthalate or the like. Stearic acid can also be incorporated as an emulsifying agent of the partially soluble hydroxyalkyl ester with an amine in water as the continuous phase. Emulsions can also be made with bentonite, which acts as an agent for making the sticky ester non-tacky. To such compositions, alcohols and other volatile substances can be added in order to hasten the evaporation of the water and accomplish a dry feel on the skin. In such compositions, the effective repellency of the hydroxyalkyl esters is substantially the same as that of the alcoholic solutions of these esters.

When applied either to man or to other higher animals, these hydroxyalkyl esters have repellency properties toward many insects, such as mosquitoes, flies, gnats, horseflies, yellow-jackets, bees and fleas. A pet bulldog, otherwise frequently molested by black flies, had his right half covered with a 5% solution of bis(3-hydroxy- 2-ethylhexyl) phthalate and the other half with a 5% solution of dibutyl maleate. Within one week, twelve applications with dibutyl maleate were required to give sufficient protection to the left flank of the dog, whereas the right flank was protected well for the entire week with just one application of the hydroxyalkyl ester. After that time, the dog was washed and then protected with ethyl 3-hydroxy-2-ethylhexyl naphthalate on the right half and with Cellosolve lactate on the left half. After two days, Cellosolve lactate had to be applied again for giving the dog proper protection, whereas no additional application was required with the hydroxyalkyl ester.

Other hydroxyalkyl esters of polybasic acids gave protection from six to ten times as long as the heretofore known rather volatile insect repellents, especially when the comparisons were made with solutions of 2% concentrations of the respective repellents in ten milliliter volumes.

The following compositions describe convenient applications of the hydroxyalkyl esters though it is understood that said mixtures are merely illustrative, as the hydroxyalkyl esters can be applied without any diluents and as such act as insect repellents.

*Examples 1–10*

Portions of 5 parts of bis(3-hydroxy-2-ethylhexyl) naphthalate were dissolved in 95 parts of the following liquids:

(1) Ethanol
(2) Isopropanol
(3) Isobutanol
(4) Kerosene
(5) Mineral spirits
(6) Butylene glycol
(7) Hexylene glycol
(8) Acetone
(9) Diethylene glycol
(10) Dipropylene glycol

*Examples 11–16*

Portions of 5 parts of bis(3-hydroxy-2-ethylhexyl) naphthalate were dissolved in 90 parts of isopropanol and 5 parts of the following liquids:

(11) Oil of citronella
(12) Oil of pennyroyal
(13) Oil of peppermint
(14) 2-ethyl-1,3-hexanediol
(15) Dimethyl phthalate
(16) Dimethyl naphthalate

*Examples 17–23*

Portions of 50 parts of bis(3-hydroxy-2-ethylhexyl) naphthalate were mixed with 50 parts of the following liquids:

(17) Oil of citronella
(18) Oil of pennyroyal
(19) Oil of peppermint
(20) 2-ethyl-1,3-hexanediol
(21) Dimethyl phthalate
(22) 1,3-butanediol
(23) Oil of cloves

*Examples 24–25*

Portions of 25 parts of bis(3-hydroxy-2-ethylhexyl) naphthalate, 25 parts of oil of pennyroyal, 25 parts of oil of peppermint were mixed together and each mixture, consisting of 75 parts, was mixed with 25 parts of the following liquids:

(24) Oil of citronella
(25) Oil of cloves
(26) Dimethyl phthalate
(27) 1,3-butanediol
(28) 2-ethyl-1,3-hexanediol
(29) Kerosene

(30) Methyl salicylate
(31) Ethanol
(32) Isopropanol
(33) Isobutanol
(34) Acetone
(35) Isopropyl ether.

The ester bis(3-hydroxy-2-ethylhexyl) naphthalate and its mixtures with solvents and other mosquito repellents, as shown in Examples Nos. 1–35 were applied to arms and faces of men working in mosquito and gnat infested meadows and woodland. Those protected with the undiluted ester reported conflicting results, such as one to three hours, apparently due to non-uniform applications due to its high viscosity. However, wherever it was visible, very few landings and no bites were counted.

With very copious applications, the ester could be made to form a continuous layer over the skin and did not evaporate during the time of the test, whereas the volatile insect repellents, such as dibutyl maleate, had disappeared after 1½ hours, and new applications were required to prevent the insects from landing and biting. With oil of citronella, oil of peppermint, dimethyl phthalate, diethyl adipate, Cellosolve acetate, Cellosolve lactate, and 2-ethyl-1,3-hexanediol, new applications were necessary between ¼ and 1½ hours as insects tried to land and mosquitoes started to bite before the film of liquid had disappeared. It was observed that the volatile repellents repel insects as long as the skin is completely covered with a visible layer which slowly disappears. Before it has completely disappeared, certain parts of the exposed arms become less protected and insects start to land and bite the poorly protected areas. Thus, it seemed necessary that for good repellency copious applications are necessary at intervals of ¼ to 1 hour, whereas with the copiously applied bis(3-hydroxy-2-ethylhexyl) naphthalate merely one application was necessary during the longest observed period of time of nine hours. The test was discontinued after this long period; yet, it is possible that a longer protection would have resulted, as the film was still intact. Though good, long lasting protection can be obtained by a copious application, the sticky feeling and the accumulation of dust on the skin is objectionable, yet not any more objectionable as the oily feel caused by the volatile insect repellents.

In order to apply less noticeable films, the solutions of Examples Nos. 1–35 were investigated. Not more than five milliliters of one solution were applied to one arm, while the other arm was treated with the same volume of a different solution or a 5% solution of a volatile insect repellent for establishing comparisons between different diluents of Examples Nos. 1–10 and with known insect repellents, which were diluted with ethanol, isopropanol, and isobutanol. These alcohols were chosen as they are good solvents for all of the cited compounds.

Little difference could be detected between the solutions of Examples Nos. 1, 2, 3, 7, 8, 9, and 10. These solutions prevented landings for about 2½ hours and bites for more than 6 hours, under essentially the same conditions consisting of men working in mosquito and gnat infested woodland and meadows, whereas the solutions of Examples Nos. 4, 6, and 11–16 prevented landings for about 4½ hours and bites for more than 6 hours. The longer repellency periods of the latter seemed to be due to the combination of hydroxyalkyl ester, substantially nonvolatile, and the volatile and effective insect repellents, which, however, when tested by themselves as solutions in alcohols and as 5% solutions in volumes of five and also in volumes of ten milliliters were not more effective than 30 minutes, and when they were applied as full strength repellents, they did not last longer than 2 hours.

Repellency periods with the mixtures of two and more insect repellents including the hydroxyalkyl naphthalate were exceptionally long, lasting more than 4 hours in preventing landings and more than 7 hours in preventing bites; the tests were usually discontinued after that time.

The improved effective repellency is due to synergism, an effect realized when more than one repellent is active. Since the hydroxyalkyl ester is substantially nonvolatile, one important function is its fixative effect on the volatile repellents. It prevents the ready evaporation of the volatile compounds due to its miscibility with them and thus lowering their rate of evaporation, and due to its much higher viscosity, the hydroxyalkyl ester is not as readily absorbed by the skin thus remaining concentrated as a layer above the epidermis.

The same fixative effect was obtained with other hydroxyalkyl esters, such as bis(3-hydroxy-2-ethylhexyl) phthalate, bis(3-hydroxy-2-ethylhexyl) oxalate, bis(3-hydroxy-2-ethylhexyl) maleate, bis(3-hydroxy-2-ethylhexyl) maleate, bis(3-hydroxy-2-ethylhexyl) succinate, bis(3-hydroxy-2-ethylhexyl) adipate, bis(3-hydroxy-2-ethylhexyl) sebacate, bis(3-hydroxy-2-ethylhexyl) cis-3,6-endomethylenetetrahydrophthalate, bis(2-hydroxyethyl) naphthalate, bis(-diethylene glycol) naphthalate, bis(triethylene glycol) naphthalate, bis(tetraethylene glycol) naphthalate, bis(2-hydroxypropyl) naphthalate, bis(3-hydroxybutyl) naphthalate, bis(2-hydroxy-2-methylamyl) naphthalate, bis(2-hydroxyethyl) maleate, bis(2-hydroxyethyl) phthalate, bis(2-hydroxyethyl) adipate, bis(2-hydroxypropyl) phthalate, bis(2-hydroxypropyl) succinate, bis(3-hydroxybutyl) sebacate, bis(3-hydroxyamyl) malonate, bis(3-hydroxyamyl) glutarate, bis(diethylene glycol) glutarate, bis(triethylene glycol) maleate, bis(tetraethylene glycol) maleate, tris(2-hydroxyethyl) aconitate, tris(3-hydroxy-2-ethylhexyl) citrate, tetris(2-hydroxypropyl) ethylenetetracarboxylate, tris(3-hydroxybutyl) benzenetricarboxylate, tris(2-hydroxyethyl) benzenetricarboxylate, hexa (2-hydroxyethyl) mellitate, 2-hydroxyethyl N,N-di(cyclohexyl)-carbamylbenzoate, (diethylene glycol) N,N-di(2-hydroxyethyl)-carbamylbenzoate, (triethylene glycol) N-ethylcarbamylbenzoate, 3-hydroxy-2-ethylhexyl N,N-di(cyclohexyl)carbamylbenzoate, 3-hydroxy-2-ethylhexyl carbamylbenzoate, methyl 3-hydroxy-2-ethylhexyl phthalate, butyl 3-hydroxy-2-ethylhexyl cis-3,6-endomethylenetetrahydrophthalate, ethyl 2-hydroxypropyl napthalate, cyclohexyl 2-(2'-hydroxypropoxy)-1-methylpropyl maleate, bis(2-hydroxypropyl) N-cyclohexylamidoaconitate, bis(3-hydroxybutyl) N,N-di(2-hydroxyethyl)amidoaconitate, bis(3-hydroxy-2-ethylhexyl) amidoaconitate, 3-hydroxy-2-ethylhexyl bis(N,N-di(2-hydroxyethyl)amido)-aconitate, methyl 3-hydroxy-2-ethylhexyl N,N-di(2-hydroxyethyl)amidoaconitate, 3-hydroxy-2-ethylhexyl bis-(N,N-di-(2-hydroxyethyl)amido)citrate, bis(3-hydroxy-2-ethylhexyl) N-propylamidocitrate, tris(3-hydroxy-1-methylamyl)citrate, tetra (2-hydroxyethyl) ethylenetetracarboxylate, tris(3-hydroxy-1,3-dimethylbutyl) trimesate, hexa (2-hydroxypropyl) mellitate, hydroxyethyl bis(N,N-dicyclohexylamido)citrate. When these hydroxyalkyl esters were substituted for bis(3-hydroxy-2-ethylhexyl) naphthalate in Examples Nos. 19, 20 and 21, repellency ranging from 3½ to 6 hours against landings and up to nine hours against bites was observed. With the undiluted esters, repellency against landings ranged from 4 to 9 hours. The best protection was obtained with the benzenepolycarboxylates and napthalenepolycarboxylates, followed closely by the other polycarboxylates containing more than three carbon atoms in the hydroxyalkyl group, but all of them, including those with but two carbon atoms in the hydroxyalkyl group, imparted good repellency to solutions of the hydroxyalkyl esters in volatile liquids as listed in Examples Nos. 1–10 and all of them had good fixative effects for the more volatile repellents which are listed in Examples Nos. 11–16. According to these results, effective fixatives for insect repellents which readily dissipate can be found among the hydroxyalkyl esters of polycarboxylic acids, which can have one of the carboxylic groups esterified with a polyhydric alcohol and the remainder of the carboxylic acid groups reacted with a monohydric alcohol or an amido-forming nitrogen compound, such as ammonia, primary or secondary amine, or primary or secondary alkylolamine. According to these results, the same fixatives are effective as insect repellents.

The methods of preparation of the hydroxyalkyl esters of polycarboxylic acids are described in the following examples:

Example 36

450 parts of 2-ethyl-1,3-hexanediol, 148 parts of phthalic anhydride, 600 parts of toluol, and 3 parts of 98% sulfuric acid are stirred for ten minutes at room temperature, and then the charge is heated to its reflux temperature and held at a constant reflux for 24 hours, separating the water from the condensed liquids before returning them to reacting charge. After the end of 24 hours, the charge is cooled to 60° C. or lower and 40 parts of sodium bicarbonate, dissolved in 1000 parts of water, are mixed with the charge for thirty minutes, when the water layer should still be alkaline, as otherwise additional amounts of sodium bicarbonate should be added and stirring continued until the water layer remains alkaline. The two layers are permitted to separate and the water layer is drawn off and discarded. The ester is washed twice more with the alkaline solution, as described, and then it is washed twice with water or until all traces of alkalinity have been removed. The water-insoluble ester is later heated under vacuum below 20 mm. Hg to a temperature of about 90° C. until no more distillation takes place. The object is the removal of all toluol, final traces of which can be flushed out with a stream of inert gas, bubbled through the charge under a partial vacuum and at an elevated temperature. The remaining ester, essentially bis(2-ethyl-3-hydroxyhexyl) phthalate, is mixed with 5 parts of filtercel and is filtered.

Example 37

450 parts 2-ethyl-1,3-hexanediol, 164 parts of cis-3,6-endomethylenetetrahydrophthalic anhydride, 650 parts of toluol are processed by the procedure of Example 36. The resulting ester is essentially bis(2-ethyl-3-hydroxyhexyl) cis-3,6-endomethylenetetrahydrophthalate.

Example 38

500 parts of triethylene glycol, 164 parts of cis-3,6-endomethylenetetrahydrophthalic anhydride, 700 parts of chlorbenzene, and 3 parts of sulfuric acid are processed by the procedure of Example 36. The resulting ester is essentially bis(3,5-dioxa-6-hydroxyhexyl) cis-3,6-3 endomethylenetetrahydrophthalate.

Example 39

600 parts of tetraethylene glycol, 164 parts of cis-3,6-endomethylenetetrahydrophthalic anhydride, 700 parts of toluene, 3 parts of sulfuric acid are processed by the procedure of Example 36. The resulting ester is essentially bis(3,5,7-trioxa-8-hydroxyoctyl) cis-3,6-endomethylenetetrahydrophthalate.

Example 40

450 parts of 2-ethyl-1,3-hexanediol, 126 parts of crystalline oxalic acid, 700 parts of toluene, and 142 parts of anhydrous sodium sulfate are processed by the procedure of Example 36. The resulting ester is essentially bis(2-ethyl-3-hydroxyhexyl) oxalate.

Example 41

450 parts of 2-ethyl-1,3-hexanediol, 98 parts of maleic anhydride, 700 parts of toluene and 3 parts of 98% sulfuric acid are processed by the procedure of Example 36. The resulting ester is essentially bis(2-ethyl-3-hydroxyhexyl) maleate.

Example 42

450 parts of 2-ethyl-1,3-hexanediol, 182 parts of cis-3,6-endothiotetrahydrophthalic anhydride, 700 parts of toluene, and 3 parts of sulfuric acid (98%) are processed by the procedure of Example 36. The resulting ester is a mixture of essentially bis(2-ethyl-3-hydroxyhexyl) cis-3,6-endothiotetrahydrophthalate and bis(2-ethyl-3-hydroxyhexyl) mercaptotetrahydrophthalate.

*Example 43*

450 parts 2-ethylhexanediol-1,3, 166 parts cis-3,6-endoxytetrahydrophthalic anhydride, 700 parts of toluene, and 142 parts of anhydrous sodium sulfate are processed by the procedure of Example 36. The resulting ester is a mixture essentially of bis(2-ethyl-3-hydroxyhexyl) cis-3,6-endoxytetrahydrophthalate and bis(2-ethyl-3-hydroxyhexyl) o-hydroxyphthalate.

*Example 44*

250 parts of tetraethylene glycol, 164 parts of cis-3,6-endomethylenetetrahydrophthalic anhydride are heated slowly (in about one hour) to 100° C. and the resulting solution is held at this temperature for two hours, cooled to about 30° C. and 120 parts of 25% dimethylamine solution is gradually added, followed by 500 parts of toluene. Then the mixture is heated to its reflux temperature and held at constant reflux while the water in the condensate is constantly removed while the non-aqueous condensate is automatically returned to the charge, until the vapor temperature reaches 110.8° C. or until no more water is present in the distillate. The charge is then cooled to 60° C. It is washed with a dilute solution of sodium bicarbonate, then with water, after which the low boiling compounds and the solvent are removed by vacuum distillation and later by flushing with an inert gas, as in Example 36. The resulting ester is essentially 3,5,7 - trioxa - 8 - hydroxyoctyl N,N - dimethylcarbamyl-cis-3,6-endomethylenetetrahydrobenzoate.

*Example 45*

The procedure of Example 44 is followed with the following reagents: 250 parts of tetraethylene glycol, 164 parts of cis-3,6-endomethylenetetrahydrophthalic anhydride, 170 parts of diamylamine, and 700 parts of toluene. The resulting ester is essentially 3,5,7-trioxa-8-hydroxyoctyl N,N-diamylcarbamyl-cis-3,6-endomethylenetetrahydrobenzoate.

*Example 46*

The procedure of Example 44 is followed with the following reagents: 250 parts of 2-ethyl-1,3-hexanediol, 164 parts of cis-3,6-endomethylenetetrahydrophthalic anhydride, 200 parts of di(cyclohexyl)amine, and 700 parts of toluene. The resulting ester is essentially 2-ethyl-3-hydroxyhexyl N,N-di(cyclohexyl)carbamyl-cis-3,6-endomethylenetetrahydrobenzoate.

*Example 47*

250 parts of 2-ethyl-1,3-hexanediol, and 164 parts of cis-3,6-endomethylenetetrahydrophthalic anhydride are heated slowly to 100° C. and the resulting solution is stirred for 2 hours at 100–110°. It is then cooled to 70° C. and 1000 parts of anhydrous methanol with 10 parts of 98% sulfuric acid are added. The charge is refluxed for 16 hours, then the bulk of the excess methanol is distilled off until the charge reaches 90° C. Then 300 parts of benzene are added, the charge is neutralized with sufficient sodium bicarbonate until the pH is between 7 and 8. The distillation is resumed until the charge reaches again 90°, when 1000 parts of ice water are added, while the mixture is stirred. Then, the layers are separated and washing with cold water is continued until the wash water remains neutral to litmus. The remainder of low boiling solvents are removed by vacuum distillation, and any solids are removed by filtration. The resulting ester is essentially methyl 2-ethyl-3-hydroxyhexyl cis-3,6-endomethylenetetrahydrophthalate.

*Example 48*

The procedure of Example 47 is followed with the following reagents: 250 parts of 2-ethyl-1,3-hexanediol, 164 parts of cis-3,6-endomethylenetetrahydrophthalic anhydride, 1000 parts of isopropanol, 10 parts of 98% sulfuric acid, and 300 parts of benzene. The resulting ester is essentially isopropyl 2-ethyl-3-hydroxyhexyl cis-3,6-endomethylenetetrahydrophthalate.

*Example 49*

The procedure of Example 36 is followed with the following reagents: 210 parts of benzenetricarboxylic acid, 383 parts of propylene glycol, 5 parts of 98% sulfuric acid, and 500 parts of toluene. The resulting ester is essentially tris(2-hydroxypropyl) benzenetricarboxylate.

*Example 50*

238 parts of tetramethyl ethylenetracarboxylate, 400 parts of propylene glycol, 2 parts of calcium hydroxide and 500 parts of toluene are heated at gentle reflux for 2 hours and then by means of a fractionating column, methyl alcohol is distilled off until 128 parts have been collected. Distillation is continued by bypassing the fractionating column to distill off toluene and a substantial portion of the excess propylene glycol. The last traces of toluene are removed by the application of vacuum and flushing out the vapors by an inert gas.

The resulting ester, essentially tetris(2-hydroxypropyl) ethylenetetracarboxylate, can be used after filtering or it can be purified by washing with water and then filtering and dehydrating with either anhydrous sodium sulfate or with some other dehydrating agent.

*Example 51*

The procedure of Example 50 is followed with the following reagents: 426 parts of hexamethyl mellitate, 620 parts of ethylene glycol, 3 parts of calcium hydroxide, and 200 parts toluene. During the ester-interchange, 192 parts of methyl alcohol are distilled. The resulting ester is essentially methyl tris(2-hydroxypropyl)ethylenetetracarboxylate.

*Example 52*

With the reagents in Example 50, the distillation is discontinued after 64 parts of methyl alcohol have been collected. The resulting ester is essentially dimethyl bis(2-hydroxypropyl) ethylenetetracarboxylate.

*Example 53*

With the reagents in Example 50, the distillation is discontinued after 96 parts of methyl alcohol have been collected. The resulting ester is essentially methyl tris(2-hydroxypropyl) ethylenetetracarboxylate.

*Example 54*

174 parts of aconitic acid, 99 parts of cyclohexylamine, and 700 parts of toluene are heated under reflux conditions during which water is removed from the condensate. When 18 parts have been collected, 380 parts of propylene glycol and 6 parts of cyclohexylammonium sulfate are added and reflux distillation is resumed, with the removal of water from the condensate. When 36 parts have been collected, the charge is cooled, first washed with dilute sodium bicarbonate solution and then with water until the wash water is neutral. Then, the water-insoluble layer is subjected to vacuum distillation to boil off toluene, the last trace being removed by blowing through a current of inert gas. The resulting ester, essentially bis(2-hydroxypropyl) N - cyclohexylcarbamylpropenedicarboxylate, is filtered.

*Example 55*

216 parts of trimethyl aconitate, 210 parts of diethanolamine, 1 part of calcium hydroxide, and 800 parts of toluene are heated and the liberated methyl alcohol is separated by means of an azeotropic distilling column. When 64 parts have been collected, 392 parts of propylene glycol are added and the azeotropic distillation is continued until 32 parts of methyl alcohol are collected during the second reaction. Then, the charge is washed with copious portions of a 20% sodium chloride solution, When the wash water is neutral after five or six washings, toluene and traces of water are removed by vacuum distillation, and any remaining inorganic salts are removed subsequently by filtration. The resulting ester is essentially hydroxypropyl bis(N,N,N',N' - tetris(hydroxyethyl) carbamyl)propenecarboxylate.

The preceding preparations of hydroxyalkyl esters are conveniently carried out in a conventional kettle, provided with an agitator, a temperature-measuring device, a condenser, and a distillation column with a condenser. The charge is usually stirred throughout the process, except at certain operations when it is more convenient to have the liquids non-turbulent.

In most of the examples it is shown that toluene is the water-immiscible liquid used for the azeotropic distillation of removing water from the charge. There are other water-immiscible liquids which can be used for the same purpose. They can be selected from any fairly low boiling range, such as the liquids boiling between 50 to 160° C., such as cyclopentane, cyclohexane, cycloheptane, hexane, pentane, octane, nonane, mineral spirits, petroleum ether, benzene, chlorbenzene, chlortoluene, fluorbenzene, fluortoluene, fluorxylene, carbon tetrachloride, trichlorethylene, or the like. If it is desired to have the water-immiscible liquid part of the insect repellent formulation, those liquids which are miscible with the resulting esters can be retained in the mixture. Other liquids with boiling points above 160° C. can be used as the liquid necessary for the formation of azeotropes with water, methanol, ethanol, propanol or the like, in those instances where instead of the methyl esters, the corresponding ethyl, propyl, butyl esters of the polycarboxylates are used for the ester-interchange reactions. These higher boiling, water-immiscible liquids can be kerosene, derivatives of toluene, benzene, xylene, or fractions of kerosene, or the like, as shown by some of the following examples.

Example 56

A composition for spraying to protect garments from moths is made by mixing together 5 parts of bis(2-ethyl-3-hydroxyhexyl) monochlormaleate in 10 parts of dichlorbenzene, 10 parts of camphor, and 75 parts of trichlorethylene.

Example 57

A spraying composition to protect garments from moths is made by mixing 5 parts of bis(triethylene glycol) naphthalate in 15 parts of mixed chlortoluenes, 10 parts of cyclohexyl p-fluorbenzoate, and 75 parts of chlorbenzene.

Example 58

A composition for impregnating wearing apparel to prevent vermin, such as fleas, lice, black flies, ants, et cetera, to creep up coats, trouser legs and other parts of garments is made by mixing 5 parts of 2-hydroxyethyl N,N-di(cyclohexyl)-carbamylbenzoate in 8 parts of kerosene, 2 parts of oil of citronella, 2 parts of oil of pennyroyal and 83 parts ethyl chloride.

Example 59

An insect repellent composition is made by mixing 5 parts of ester of Example 38, 10 parts of 2-ethylhexanediol-1,3 and 85 parts of isopropanol. This composition repelled insects four times as long as a 15% 2-ethylhexanediol-1,3 solution in isopropanol.

Example 60

An insect repellent composition is made by mixing 5 parts of ester of Example 44, 10 parts of dimethyl endomethylenetetrahydrophthalate and 85 parts of isopropanol. This composition protected men working in gnat and mosquito infested areas from bites three times as long as a 15% solution of dimethyl endomethylenetetrahydrophthalate.

Example 61

An insect repellent composition is made by mixing 5 parts of ester of Example 45, 10 parts of amylide of 3,6-endomethylene-4-cyclohexene-1,2-dicarboxylic acid, and 85 parts of isopropanol. This composition protected men in mosquito and gnat infested areas twice as long as a 15% solution of the amylide of 3,6-endomethylene-4-cyclohexene-1,2-dicarboxylic acid.

Example 62

5 parts of tris(2-hydroxyethyl) benzenetricarboxylate, 5 parts of isopropanol and 5 parts of bentonite dispersed in 100 parts of water were made into an emulsion, which when applied to forearms and faces of men working in mosquito-infested areas prevented mosquito bites for five hours.

Example 63

100 parts of bis(2-hydroxypropyl) N-cyclohexyl-amidoaconitate, 2 parts of triethanolamine, 37 parts of stearic acid, 7 parts of propylene glycol, and 5 parts of Carbitol (diethylene glycol monoethyl ether) were mixed with 120 parts of water. The resulting emulsion applied to forearms and faces of men working in mosquito-infested areas prevented mosquito bites for seven hours.

Example 64

100 parts of tris(3-hydroxy-2 - ethyl - 2 - butylpropyl) citrate, 20 parts of isopropanol, 40 parts of bentonite, and 10 parts of talc were made into a creamy consistency. The resulting paste applied to forearms and faces of men working in mosquito-infested areas prevented mosquito bites for seven hours, after which the tests were discontinued.

Example 65

100 parts of bis(3-hydroxy-2-ethyl-2-hexylpropyl) oxalate, 20 parts of isopropanol, 40 parts of bentonite, and 10 parts of talc were worked into a creamy consistency. The resulting paste applied to forearms and faces of men working in mosquito-infested areas prevented mosquito bites for seven hours, after which time the tests were discontinued.

The object of incorporating bentonite, stearic acid or the like in insect repellent compositions is to provide for easy application of the hydroxyalkyl esters and eliminate the sticky feel resulting if too much of the ester is applied to bare parts of the body. The other hydroxyalkyl esters were found also very efficient in preventing bites by insects. According to the observations, it was found that hydroxyalkyl esters of polycarboxylic acids, in general, had unusually long repellency periods as compared with the usual volatile insect repellents. These observations were made by comparing both types in emulsions, such as shown by Examples 61 and 62, in solutions, as shown in Examples 1–10, and as the undiluted compounds.

For rub-on applications to exposed parts of the body, it is thus preferred to have the hydroxyalkyl ester mixed with an alcohol, preferably ethyl alcohol and isopropyl alcohol, or an ether, preferably isopropyl ether, or a ketone, preferably acetone, isopropyl ketone, acetophenone and eugenol, or an ester, preferably dimethyl phthalate, dimethyl naphthalate, dimethyl adipate, methyl salicylate and dibutyl malonate, or an aldehyde, preferably anisaldehyde, or a glycol, preferably butylene glycol and 2-ethyl-1,3-hexanediol, or an essential oil, preferably oil of pine, oil of citronella, oil of pennyroyal, oil of peppermint and oil of cloves. For spraying and fumigation applications, the hydroxyalkyl ester can be mixed with toxic diluents, such as acrylonitrile, aniline and its derivatives, phenol and its derivatives, mixed dichlorobenzenes, mixed dichlorotoluenes, acrolein, furfural, carbon disulphide and the like, providing proper precautions are taken during handling and applying these mixtures. For banishing insects and also rodents from enclosed spaces, inaccessible to man and housepets, in structures and dwellings, compositions recommended consist of a hydroxyalkyl ester of a polycarboxylic acid with one or more of the following compounds: aniline and its chlor-containing derivatives, chlorbenzenes, chlortoluenes, carbon tetrachloride, chlorophenols, dichlorodiphenyltrichloroethane, naphthenic acid and any of its soaps. With such combinations, a semiannual application, preferably one in spring and one in the fall, is sufficient to banish squirrels, mice, rats and other rodents, termites, ants and other insects and prevents them from establishing permanent habitats in the thus-treated spaces.

In all of these applications, it has been observed that the mixture of an effective, but short-lived repellent and a hydroxyalkyl polycarboxylate provided for a longer lasting repellency than either the repellent by itself or the hydroxyalkyl ester by itself. This phenomenon, known as synergism, might be caused by many varied effects of the constituents of a mixture. Since many alcohols, ketones, glycols, aldehydes and terpenes have antibactericidal properties, their functions can be explained on the basis that they prevent or reduce the decomposition of perspiration exuded matter, whereby the hydroxyalkyl ester, a fixative, has its insect repellency improved merely by having the bacteria on the skin made impotent. With the rodent repellent properties of the compositions, the functions of the hydroxyalkyl ester point toward the action of a fixative, which retards the evaporation of the volatile repellents and which also retards their decomposition or oxidation, especially with compounds such as dichlorodiphenyltrichloroethane, chloraniline, chlorophenols or the like, which by themselves alone in thin films had lost most of their identity and also their rodent repellency after two months, whereas thin films of the mixtures with a hydroxyalkyl ester remained effective for more than six months. An additional effect might be the odor of the mixtures which seems to be annoying to these animals.

These explanations of the causes of the synergistic effects, it should be understood, represent possibilities and might not be the absolute facts, as many of the varied properties might be the cause of synergism. The object of this invention is the unexpected fact that the hydoxyalkyl esters of polycarboxylic adds have insect repellent properties, which can be enhanced by an inert diluent or volatile insect repellent, whose insect repellent properties, in turn, are improved by the presence of the hydroxyalkyl ester. In this case, the term "inert diluent" defines that the liquefier apparently does not enter into or cause a chemical reaction with the hydroxyalkyl ester, and it does not imply that said diluent is not capable of producing enhanced physiological or toxicological effects to the lower types of animals, as according to all indications such unexpected effects seem to exist.

It is thus the primary object of this invention to provide for a longer lasting insect repellent by means of a hydroxyalkyl ester of a polycarboxylic acid.

It is a further object to provide for a longer lasting effectiveness of a volatile insect repellent by having incorporated with it a hydroxyalkyl ester of a polycarboxylic acid.

It is a further object of this invention to provide for repellents for banishing insects and rodents from dwellings and other structures with the aid of a hydroxyalkyl ester of a polycarboxylic acid.

It is a further object of this invention to provide for methods of repelling and banishing insects and rodents from dwellings and other structures.

It has furthermore been shown that new types of compounds, such as the hydroxyalkyl esters of tribasic acids, tetrobasic and hexabasic acids, hydroxyalkyl esters of polybasic acids in which a carbonyl radical is bound to an alkoxy radical, hydroxyalkyl esters of polycarboxylic acids in which a carbonyl radical is bound to an amido radical, are effective insect repellents.

It has furthermore been disclosed how the hydroxyalkyl esters of polycarboxylic acids, the alkyl hydroxyalkyl esters of polybasic acids, and the hydroxyalkyl amidopolycarboxylates can be prepared.

Thus, it will be seen that the present invention describes new methods of repelling insects as well as new compositions useful in repelling insects. A basic component permitting one to obtain the advantages of this invention is an ester. Many of these esters have been described in the specification and the examples. It will be seen that they generally fall into an empirical formula which may be stated as follows:

wherein R is the residue of a polycarboxylic acid selected from the group consisting of an aliphatic acid, aromatic acid and a cycloaliphatic acid, A is selected from the group consisting of an aliphatic group, an alkoxyaliphatic group and a polyalkoxyaliphatic group; $R_1$ and $R_2$ are selected from the group consisting of hydrogen, an aliphatic group, an aryl group, a cycloaliphatic group and a hydroxyalkyl group; $x$ plus $y$ equals 2–6, $x$ equals 1–6 and $y$ equals 0–2.

It is particularly important to note that the effective time of repellency of the esters of this invention is greatly increased by the use of a relatively volatile organic liquid diluent which may be inert and possess little or no insect repellency properties when applied in the absence of the ester. It is also important to note that the effective time of repellency of the composition may be further increased by the use of a volatile insect repellent in combination with one of the esters and/or with a diluent. The discovery that the esters may be applied to live human and other animal skin to effect long periods of insect repellency even in the absence of a diluent or a volatile insect repellent forms another important part of this invention.

These objects have been described and illustrations have been made by examples, which, it is understood, are not limitive.

What is claimed is:

1. A method of repelling insects which comprises applying an insect repelling composition to the area to be made repellent, said composition including a relatively volatile organic liquid diluent and a viscous liquid ester of the following composition:

wherein R is the residue of a polycarboxylic acid selected from the group consisting of an aliphatic acid, aromatic acid and a cycloaliphatic acid, A is selected from the group consisting of an aliphatic group, an alkoxyaliphatic group and a polyalkoxyaliphatic group; $R_1$ and $R_2$ are selected from the group consisting of hydrogen, an aliphatic group, an aryl group, a cycloaliphatic group and a hydroxyalkyl group; $x$ plus $y$ equals 2–6, $x$ equals 1–6, $y$ equals 0–2, said ester being relatively nonvolatile upon live human and other animal skin under ordinary atmospheric conditions and said diluent serving to improve the effective repellency range of said ester, the composition being characterized by its long period of repellency.

2. A method of repelling insects as defined in claim 1 wherein said ester is one in which the value of $x$ is 2 and the value of $y$ is 0.

3. A method of repelling insects as defined in claim 1 wherein said ester is one in which the value of $x$ is 1 and the value of $y$ is at least 1.

4. A method of repelling insects as defined in claim 1 wherein said ester is one in which the value of $x$ is 1 and the value of $y$ is 1.

5. A method as set forth in claim 1 wherein said insect repelling composition includes, in addition, a volatile insect repellent, the insect repellency of the composition being more effective than that of either of ester or the volatile repellent alone.

6. An insect repellent composition comprising an insect diluent, a volatile insect repellent and a viscous liquid of the general formula

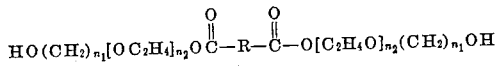

wherein $n_2$ is an integer from 0 to 3, $n_1$ is an integer from 2 to 8 and R is a radical of a dibasic carboxylic acid containing no elements other than C, H, O and Cl.

7. An insect repellent composition comprising an inert diluent, a volatile insect repellent, and a viscous liquid compound of the general formula

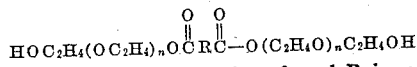

wherein $n$ is an integer from 2 to 3 and R is residue of a dibasic carboxylic acid containing no elements other than C, H, O and Cl.

8. An insect repellent composition comprising an inert diluent, a volatile insect repellent, and a viscous liquid compound of the general formula

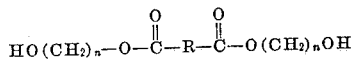

wherein $n$ is an integer from 2 to 8 and R is the radical of a dibasic carboxylic acid containing no elements other than C, H, O and Cl.

9. An insect repellent composition comprising a relatively volatile organic liquid diluent, a volatile insect repellent and a viscous liquid ester of the following formula:

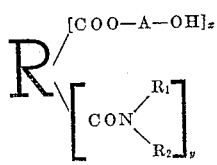

wherein R is the residue of a polycarboxylic acid selected from the group consisting of an aliphatic acid, aromatic acid and a cycloaliphatic acid, A is selected from the group consisting of an aliphatic group, an alkoxyaliphatic group and a polyalkoxyaliphatic group; $R_1$ and $R_2$ are selected from the group consisting of hydrogen, an aliphatic group, an aryl group, a cycloaliphatic group and a hydroxyalkyl group; $x$ plus $y$ equals 2–6, $x$ equals 1–6, $y$ equals 0–2, said ester being relatively nonvolatile upon live human and other animal skin under ordinary atmospheric conditions and said diluent serving to improve the effective repellency range of said ester, the composition being characterized by its long period of repellency.

10. An insect repellent composition comprising a volatile insect repellent and a viscous liquid ester of the following formula:

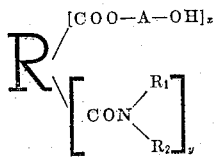

wherein R is the residue of a polycarboxylic acid selected from the group consisting of an aliphatic acid, aromatic acid and a cycloaliphatic acid, A is selected from the group consisting of an aliphatic group, an alkoxyaliphatic group and a polyalkoxyaliphatic group; $R_1$ and $R_2$ are selected from the group consisting of hydrogen, an aliphatic group, a aryl group, a cycloaliphatic group and a hydroxyalkyl group; $x$ plus $y$ equals 2–6, $x$ equals 1–6, $y$ equals 0–2, said ester being relatively nonvolatile upon live human and other animal skin under ordinary atmospheric conditions and said diluent serving to improve the effective repellency range of said ester, the composition being characterized by its long period of repellency.

11. A method of repelling insects which comprises applying to the area to be made repellent an insect repellent composition including a viscous liquid ester of the following formula:

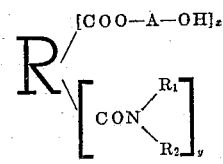

wherein R is the residue of a polycarboxylic acid selected from the group consisting of an aliphatic acid, aromatic acid and a cycloaliphatic acid, A is selected from the group consisting of an aliphatic group, an alkoxyaliphatic group and a polyalkoxyaliphatic group; $R_1$ and $R_2$ are selected from the group consisting of hydrogen, an aliphatic group, an aryl group, a cycloaliphatic group and a hydroxyalkyl group; $x$ plus $y$ equals 2–6, $x$ equals 1–6, $y$ equals 0–2, said ester being relatively nonvolatile upon live human and other animal skin under ordinary atmospheric conditions, the composition being characterized by its long period of repellency.

12. A method as set forth in claim 1 wherein said ester is the ester of a dicarboxylic acid with each esterified carboxyl group containing a hydroxyalkyl group.

13. A method as set forth in claim 1 wherein said ester has at least one carboxyl group esterified with 2-ethyl-1,3 hexanediol.

14. A method as set forth in claim 11 wherein said ester is the ester of a dicarboxylic acid wherein the esterified carboxyl group is linked with a hydroxyalkyl group and the other carboxyl group is reacted to form a carbamyl group.

15. A method as set forth in claim 11 wherein said ester is the fully esterified ester of a tricarboxylic acid, with each esterified carboxyl group being linked with a hydroxyalkyl group.

16. A method as set forth in claim 11 wherein said ester contains an esterified carboxyl group wherein the esterifying group is a hydroxyalkyl group.

17. A method as set forth in claim 11 wherein said ester is the ester of a dicarboxylic acid in which both carboxyl groups are linked to a hydroxyalkyl group.

18. A composition as set forth in claim 9 wherein said ester is the ester of a dicarboxylic acid wherein one carboxyl group is reacted to form a hydroxyalkyl group and the other carboxyl group is linked with a carbamyl group.

19. A composition as set forth in claim 9 wherein said ester is the ester of a tricarboxylic acid in which all three carboxyl groups are linked with the hydroxyalkyl group.

20. A composition as set forth in claim 9 wherein said ester contains at least one carboxyl group linked with an alkyl hydroxyalkyl group.

21. A composition as set forth in claim 9 wherein said ester is the ester of a dicarboxylic acid in which both carboxyl groups are linked to a hydroxyalkyl group.

22. A composition as set forth in claim 10 wherein said ester is the ester of a dicarboxylic acid wherein one carboxyl group is linked with a hydroxyalkyl group and the other carboxyl group is reacted to form a carbamyl group.

23. A composition as set forth in claim 10 wherein said ester is the ester of a tricarboxylic acid in which all three carboxyl groups are linked with the hydroxyalkyl group.

24. A composition as set forth in claim 10 wherein said ester contains an esterified carboxyl group wherein the esterifying group is a hydroxyalkyl group.

25. A composition as set forth in claim 10 wherein said ester is the ester of a dicarboxylic acid in which both carboxyl groups are linked to a hydroxyalkyl group.

References Cited in the file of this patent

UNITED STATES PATENTS

| | | |
|---|---|---|
| 1,924,507 | Markowsky | Aug. 29, 1933 |
| 2,273,860 | Granett | Feb. 24, 1942 |
| 2,345,041 | Ericks | Mar. 28, 1944 |
| 2,375,563 | Kirk | May 8, 1945 |
| 2,527,322 | Morey | Oct. 24, 1950 |